(12) United States Patent
Perales et al.

(10) Patent No.: US 7,509,008 B2
(45) Date of Patent: Mar. 24, 2009

(54) METHOD AND APPARATUS FOR LOCATING A LOCALIZED TEMPERATURE CHANGE IN A WORKSPACE

(75) Inventors: Kenneth Perales, Rosenberg, TX (US); Daniel J. Mullins, Charleston, WV (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 11/539,245

(22) Filed: Oct. 6, 2006

(65) Prior Publication Data

US 2008/0084913 A1  Apr. 10, 2008

(51) Int. Cl.
- *G02B 6/00* (2006.01)
- *G01J 5/08* (2006.01)
- *G01K 11/00* (2006.01)

(52) U.S. Cl. .......................... 385/100; 385/12; 385/13; 374/131; 374/137; 374/161

(58) Field of Classification Search ........................ None
See application file for complete search history.

(56) References Cited

U.S. PATENT DOCUMENTS

| | | | |
|---|---|---|---|
| 3,900,878 A | 8/1975 | Tsao | |
| 5,028,146 A | 7/1991 | Wada | |
| 5,163,321 A | 11/1992 | Perales | |
| 6,547,435 B1 | 4/2003 | Grosswig et al. | |
| 6,557,249 B1 | 5/2003 | Pruett et al. | |
| 6,557,630 B2 | 5/2003 | Harkins et al. | |
| 6,751,556 B2 | 6/2004 | Schroeder et al. | |
| 6,807,324 B2 * | 10/2004 | Pruett | 385/12 |
| 6,817,759 B2 | 11/2004 | Chi et al. | |
| 6,955,218 B2 | 10/2005 | Coon et al. | |
| 7,055,604 B2 | 6/2006 | Jee et al. | |
| 7,086,484 B2 | 8/2006 | Smith, Jr. | |
| 2004/0112596 A1 * | 6/2004 | Williams et al. | 166/250.03 |
| 2005/0089081 A1 * | 4/2005 | Dammann | 374/161 |
| 2005/0140966 A1 * | 6/2005 | Yamate et al. | 356/73.1 |

(Continued)

FOREIGN PATENT DOCUMENTS

DE  102004024073 A1  1/2006

(Continued)

OTHER PUBLICATIONS

Agilent Technologies, "N4385A/N43864A Distributed Temperature System (DTS)," 2006, 8 pgs.

(Continued)

*Primary Examiner*—Tina M Wong
(74) *Attorney, Agent, or Firm*—Conley Rose

(57) ABSTRACT

A method for monitoring a workspace comprising deploying a fiber optic distributed temperature sensor cable in the workspace, wherein the sensor is capable of detecting a temperature differential of ±10° F. from baseline. A method for monitoring a workspace comprising deploying a fiber optic distributed temperature sensor cable in the workspace, wherein the sensor is readily accessible for contact by a worker trapped in the workspace to signal a location of the worker. A method for monitoring a workspace comprising deploying a fiber optic distributed temperature sensor cable in the workspace and instructing workers to locate the cable and position themselves in close proximity or direct contact with the cable in order to indicate their position within the workspace.

22 Claims, 2 Drawing Sheets

U.S. PATENT DOCUMENTS

| | | | |
|---|---|---|---|
| 2005/0173111 A1* | 8/2005 | Bostick, III | 166/250.01 |
| 2006/0157239 A1* | 7/2006 | Ramos et al. | 166/254.2 |
| 2006/0159400 A1* | 7/2006 | Richards et al. | 385/53 |

FOREIGN PATENT DOCUMENTS

| | | |
|---|---|---|
| EP | 0 501 323 | 6/1996 |
| EP | 0939064 A2 | 9/1999 |
| GB | 2289331 A | 11/1995 |
| JP | 2000110499 | 4/2000 |
| SU | 1789019 A3 | 1/1993 |

OTHER PUBLICATIONS

Dubaniewicz, Thomas H., et al., "Fiber Optics for Atmospheric Mine Monitoring," IEEE Transactions on Industry Applications, vol. 29, No. 4, Jul./Aug. 1993, pp. 749-754.

Fiber Instrument Sales, Inc., "Mine Security Systems," 1 pg.

U.S. Appl. No. 10/378,443, filed Mar. 3, 2003, entitled "Optical Fiber Cable."

Zhang, Zaixuan, et al., "Distributed optical fiber temperature sensor (DOFTS) system applied to temperature automatically alarm of coal-mine and tunnel," International Conference on Sensors and Control Techniques, Proceedings of SPIE, vol. 4077, 2000, pp. 128-132.

Foreign communication from a related counterpart application—International Search Report and Written Opinion, PCT/US2007/080158, Apr. 4, 2008, 15 pages.

* cited by examiner

METHOD AND APPARATUS FOR LOCATING A LOCALIZED TEMPERATURE CHANGE IN A WORKSPACE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present disclosure relates to an apparatus and method for locating personnel and/or events that cause localized temperature changes in a workspace. More particularly, the present disclosure is directed to improving the safety of workers by readily determining the location of the trapped/distressed worker(s) and the location of the worker(s) in relation to any threatening situation in a workspace such as a cave-in, fire, explosion, or flood.

2. Background of the Invention

Survival of workers trapped in a workspace often depends upon quickly locating the trapped workers and commencing rescue operations. For example, tragic deaths of trapped miners in West Virginia, Alabama, and other states in recent years has made it clear that the mining industry needs to solve the problem of locating personnel in the event a mine becomes compromised. Previous attempts to monitor the locations of miners in tunnels include equipping each miner with a locator/ID transmitter and placing sensors throughout the mine, in a method similar to a GPS system. This system is expensive and has not proven reliable or robust enough for a mine environment. Similarly, electronic systems, which are expensive, must be turned off in many cases due to the danger of explosions, thus precluding their use when they are needed the most. Likewise, mechanical systems can be destroyed in a catastrophe.

Current efforts to rescue trapped miners have been mostly limited to drilling a hole in the "best guess" method that relies on serendipity rather than science in the location of lost miners. A method for determining where in the tunnel system a fire, cave-in, or other danger exists in addition to determining the location of any trapped miners would allow determination of whether any trapped personnel are in immediate danger as well as letting rescue workers know exactly where to drill holes in order to provide air, communications and extraction of people more rapidly than the hit or miss methods employed to date.

Accordingly, an ongoing need exists for a cost-effective and reliable method and apparatus for rapidly and specifically locating trapped personnel and/or safety hazards (e.g., fire, explosion, flood, cave-in) in workspaces such as underground corridors.

BRIEF SUMMARY OF SOME OF THE PREFERRED EMBODIMENTS

Disclosed herein is a method for monitoring a workspace comprising deploying a fiber optic distributed temperature sensor cable in the workspace, wherein the sensor is capable of detecting a temperature differential of ±10° F. from baseline. The workspace may be subterranean, for example a mine, tunnel, or cave. The cable may be disposed at or below a midpoint of a wall of at least one corridor in the workspace. For example, the cable may run along the floor of the at least one corridor. The cable may further comprise an outer protective conduit. The method may further comprise cushioning the cable to protect the cable in the event of a structural failure in the workspace. For example, the cable may be cushioned with sand, soil or gravel to protect from a structural failure such as a collapse, cave-in, fire, explosion, or flood. The temperature differential may be provided by one or more workers in close proximity to or direct contact with the sensor. Alternatively, the temperature differential may be caused by a structural change in the workspace. Alternatively, the temperature differential may be provided by a collapse, cave-in, fire, explosion, or flood in a subterranean workspace. Alternatively, the temperature differential may be provided by one or more workers in close proximity to the sensor; the temperature differential may be provided by a collapse, cave-in, fire, explosion, or flood in a subterranean workspace; or both, wherein the sensor is capable of differentiating between the two. The sensor may be capable of measuring temperatures in spatial increments of less than 1 m, for example such that the location of a trapped worker or workspace event may be determined to be equal to or less than 3 m. The deploying may further comprise pumping an optical fiber though an outer protective conduit and/or pushing an optical fiber through an outer protective conduit. The cable may comprise an optical fiber protected by an outer conduit and wherein the deploying comprises laying the cable along one or more corridors in the workspace. The method may further comprise retrieving the sensor from the workspace and redeploying the sensor in a different location.

Further disclosed herein is a method for monitoring a workspace comprising deploying a fiber optic distributed temperature sensor cable in the workspace, wherein the sensor is readily accessible for contact by a worker trapped in the workspace to signal a location of the worker. The cable may be disposed at or below a midpoint of a wall of at least one corridor in the workspace.

Further disclosed herein is a method for monitoring a workspace comprising deploying a fiber optic distributed temperature sensor cable in the workspace and instructing workers to locate the cable and position themselves in close proximity or direct contact with the cable in order to indicate their position within the workspace.

Further disclosed herein is a method of calibrating a computer program associated with a distributed temperature sensor system comprising deploying a fiber optic distributed temperature sensor cable in a workspace, positioning a worker in close proximity or direct contact with a distributed temperature sensor cable, and monitoring time based sensor data response.

Further disclosed herein is a method for training workers who work in a workspace comprising deploying a fiber optic distributed temperature sensor cable in the workspace and instructing workers to locate the cable and position themselves in close proximity or direct contact with the cable in order to indicate their position within the workspace. The fiber optic distributed temperature sensor cable may be capable of detecting a temperature differential of ±10° F.

Further disclosed herein is a subterranean coal mine comprising at least one corridor, a temperature sensor cable deployed within said corridor capable of detecting a temperature differential of ±10° F. from a baseline at each of multiple spatial locations, and a processor for interrogating said temperature sensor cable. The cable may be disposed at or below a midpoint of a wall of said corridor, for example disposed along the floor of the said corridor. The cable may further comprise an outer protective conduit. The cable may be cushioned for protection in the event of a structural failure in the mine.

Further disclosed herein is a method for monitoring a workspace comprising deploying at least one fiber optic distributed temperature sensor cable in the workspace, each said cable capable of detecting a temperature differential of ±10° F. from a baseline at multiple spatial locations and each said cable being in communication with a processor that is programmed to periodically interrogate the fiber, and determining the baseline temperature distribution along each said cable. The method may further comprise instructing workers who work in the workspace to locate the cable and transmit body heat to the cable in order to cause a detectable temperature differential and indicate the position of the worker in the workspace.

Further disclosed herein is a method of monitoring the position of workers in a workspace comprising deploying a fiber optic distributed temperature sensor cable in the workspace, and training the workers to locate the cable and raise the temperature of the cable in order to indicate the position of the worker within the workspace. The cable may be capable of detecting a temperature differential of ±10° F. from a baseline.

Further disclosed herein is a method of training a worker who works in a workspace comprising instructing the worker on where to locate a fiber optic distributed temperature sensor cable deployed within the workspace, and teaching the worker to use body heat or otherwise heat the cable to indicate the position of the worker within the workspace. The worker may be taught to heat the cable by ±10° F. to indicate the position of the worker in the workspace.

Further disclosed herein is a computer system for monitoring a workspace, said system comprising a computer linked to at least one distributed temperature sensor cable deployed in the workspace, said computer comprising programming for determining a baseline temperature distribution along each said cable and for periodically interrogating each said cable and indicating a difference from baseline at each of multiple spatial locations along each respective cable. The at least one distributed temperature sensor cable may be capable of detecting a temperature differential of ±10° F. from baseline at each of multiple spatial locations along the length of the cable.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Disclosed herein are methods and apparatus for locating areas of localized temperature change in a workspace, thereby providing an indicator of trapped personnel and/or potential safety hazards such as fires, explosions, cave-ins, and floods. More particularly, disclosed herein is system capable of detecting a change in temperature along the length of an optical fiber distributed temperature sensor (DTS), said change in temperature being due to and indicating the presence of the heat of a human body, a cave-in, a fire, an explosion, a flood, or another event in a workspace. Also disclosed herein is a method of training trapped or endangered workers to help rescue personnel pinpoint their location in the workspace by placing themselves in close proximity or direct contact (if possible) with a cable containing at least one optical fiber distributed temperature sensor that has been disposed within the workspace.

In an embodiment, the workspace is an underground workspace such as a subterranean corridor, which includes any underground passage or corridor where personnel work such as a mine shaft, tunnel, cave, subway, sewer line, wastewater line, storm runoff line, pipeline, etc. In alternative embodiments, the workspace may include other enclosed or confined areas where workers may become trapped such as a large building, structure, vessel, ship, offshore platform, etc. The remainder of the disclosure will focus on an embodiment wherein the workspace is a mine such as a coal or precious mineral mine with the understanding that the concepts disclosed herein may be readily adapted to other workspaces. In various embodiments, a DTS system is deployed in such workspaces, thereby providing a means for detecting localized temperature changes and locating distressed workers and/or safety hazards within the workspace.

Figure 1:
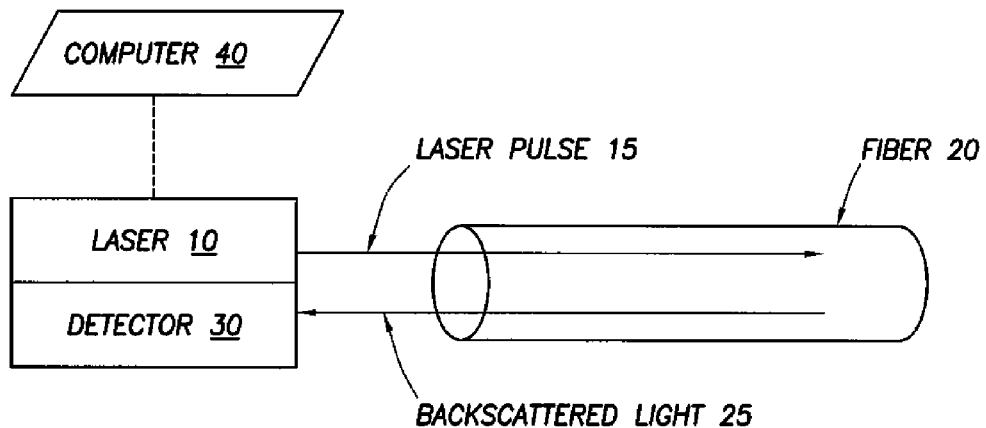
FIG. 1 is a schematic of the principles of distributed temperature sensing, DTS, showing the various types of scattered light resulting from the laser pulses.
Figure 2:
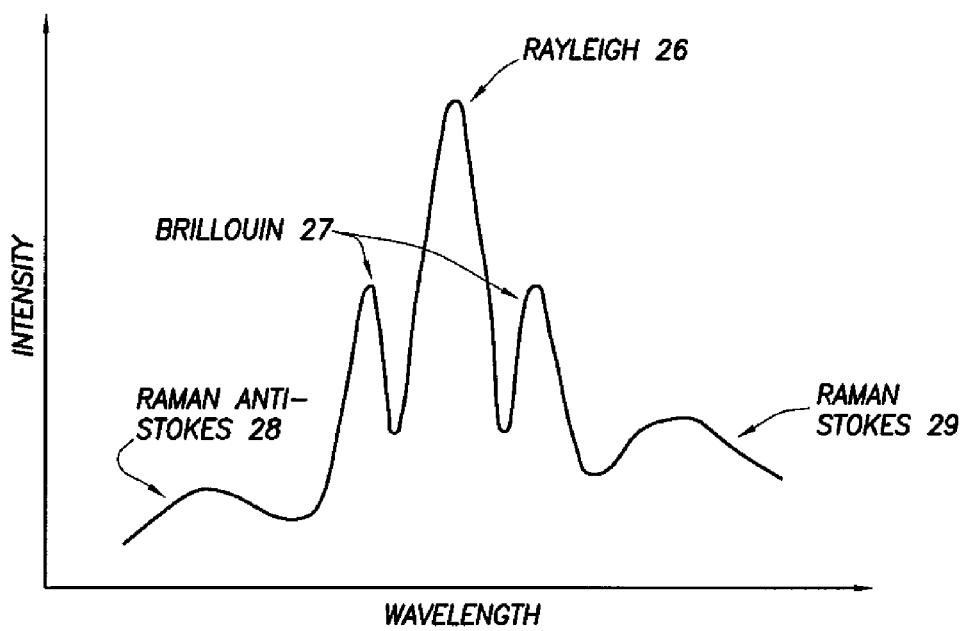
FIG. 2 is a schematic of the path of the laser pulse during DTS with an optical fiber as the distributed sensor.

Distributed temperature sensing, DTS, uses an optical fiber to sense temperature over the length of the fiber. The use of optical fiber distributed temperature systems is disclosed, for example, in U.S. Pat. Nos. 7,055,604; 6,751,556; 7,086,484; 6,557,630; and 5,028,146, each of which is incorporated herein by reference in its entirety. The optical fiber based DTS is used to obtain the continuous temperature profiles along the entire length of the fiber at user-selected time intervals. Referring now to FIGS. 1 and 2, in DTS, an optical laser 10 sends a series of pulses through an optical fiber 20 and backscattered light which returns to the transmitting end is analyzed with a detector 30 and a computer 40. As shown in the inset of FIG. 1, the scattered photons include Rayleigh scattering (elastic collisions; scattering with the wavelength of the laser source, i.e. incident light), Brillouin scattering (non-elastic collisions) and Raman scattering (non-elastic collisions). When light of any wavelength passes through the fiber 20, some photons will be scattered at different wavelengths. This phenomenon takes place on the quantum level. Raman scattering is reflected light which has been shifted in wavelength above and below the wavelength of the incident light. Raman light has two components known as Stokes and anti-Stokes. The magnitude of the Stokes bands are orders of magnitude less than the central Rayleigh wavelength, but these sidebands are sensitive to temperature. The intensity of the anti-Stokes component is much more sensitive to changes in temperature than the Stokes component. By examining the differences in pulse timing, Stokes and anti-Stokes intensities, the DTS instrument can determine the temperature profile along the entire length of fiber. Thus, the Raman scattering is a measurement of the temperature along the fiber. The position of the temperature reading is determined by measuring the arrival timing of the returning light pulse similar to a radar echo.

In more detail, as shown in FIG. 2, to make distributed temperature measurements using an optical fiber 20 as the distributed sensor, the laser 10 is operated to pulse light energy down the optical fiber 20. Temperature measurements can be made at each point along the length of the fiber 20. Most distributed temperature sensing systems utilizing optical fibers 20 rely on Optical Time Domain Reflectometry, OTDR, to determine the spatial position of an individual measurement. OTDR is a standard method of determining losses along the length of an optical fiber 20. The time it takes for the reflected light to return to the laser source 10 is detected with the detector 30 and indicates the precise position along the optical fiber 20 where the measurement is being taken. The characteristics of the reflective light are analyzed with a computer 40 using known techniques, such as the Raman backscattering mentioned above, to determine the temperature at that precise position. Thus, for each pulse of the laser 10, the time at which the backscattered light propagates from the various points along the optical fiber 20 is proportional to the distance along the fiber from which the backscattered light is received. Using ODTR the entire length of the optical fiber 20 can be interrogated and a series (e.g. meter by meter) of temperature data obtained. The operator (or a computer) can pulse the laser 10 again and repeat the measurement sequence at each position along the optical fiber 20, and so on. This will provide a number of temperature measurements at each position such that temperature differentials can be determined from which thermal properties can be inferred by conventional methods. While Raman backscattering and ODTR techniques are used commonly in DTS, other methods of DTS are known which may serve the purpose of detecting temperature at multiple locations along a fiber, which may include use of Brillouin spectra, Rayleigh spectra, or multiple Bragg or other gratings and/or interferometers in the fiber.

DTS has many advantages over the use of electrical probes for temperature sensing in mines. Fiber optic cables are immune to electromagnetic interference, intrinsically safe for use in hazardous zones, maintenance free for decades, resistant to harsh environmental conditions, and easy to integrate and install. One system can scan the entire length simultaneously and each fiber optic used as a sensor yields thousands of measurement points.

A suitable DTS system for the present disclosure is the OptoLog DTS system available through Halliburton Energy Services. The temperature resolution of the DTS system of the present disclosure depends on the time and distance along the fiber, with typical resolutions of ±1° F. with appropriate measurement time. The accuracy of the temperature is also dependent upon the measurement time and distance along the fiber, requiring pre-calibration or system calibration point, with typical temperature accuracy of ±1° F. In an embodiment, the point to point distance (sampling resolution) of the system is from 0.2 m to 1 m. In an embodiment, the spatial resolution (resolvable distance of point change in temperature) is from 1 m to 3 m. In an embodiment, the optical fiber DTS is installed throughout the tunnel system and allows detection of changes in temperature within every 1 m to a change of around ±10° F., alternatively ±9° F., alternatively ±8° F., alternatively ±7° F. alternatively ±6° F., alternatively ±5° F., alternatively ±4° F., alternatively ±3° F., alternatively ±2° F., alternatively ±1° F. In some embodiments a computer or processor may be employed to interrogate the fiber as instructed by a human operator or automatically in accordance with a pre-set program. In a computerized embodiment, either the source or the detectors may be computer controlled and set to periodically interrogate the fiber, e.g. every minute or on a longer frequency, such that the laser source is activated and transmits the pulses and the detectors detect the reflected light at the preset time interval. The computer may display results visually (on a monitor and/or log) as a temperature (or delta vs. baseline) vs. distance plot or log. A family of curves or logs may be displayed to show changes over time.

Figure 3:
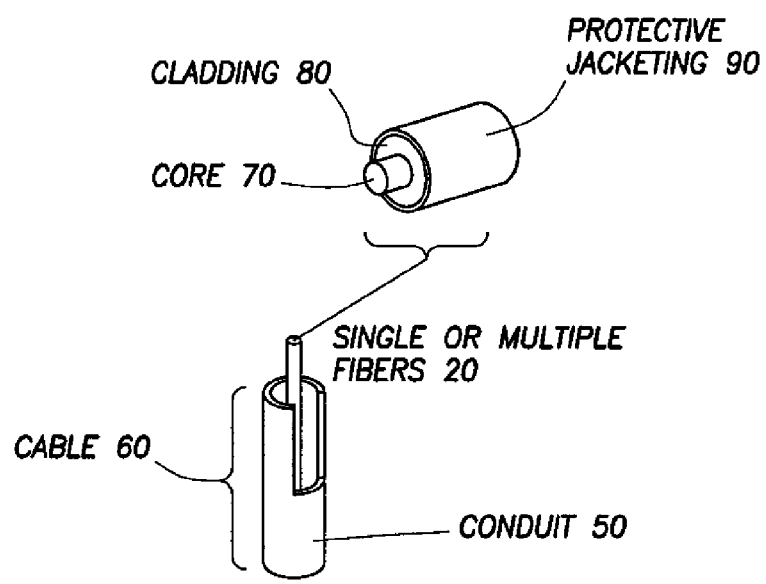
FIG. 3 is a schematic showing the makeup of a fiber optic cable of an embodiment of this disclosure.

Optical fibers are thin, transparent fibers made of glass or plastic that are enclosed by a material of a lower refractive index and that transmit light throughout their length by internal reflections. In order for the optical fiber(s) to survive the mine environment, it should be protected. This may be accomplished by placing the fiber inside an outer conduit or sheath to form a fiber optic cable. As shown in FIG. 3, the fiber optic cable 60 may comprise single or multiple optical fibers 20 encased in an outer conduit 50. The fibers 20 comprise a core 70, a cladding 80, and a protective jacketing 90. In an embodiment, the outer conduit 50 is a heavy-walled tube or similar protective covering that would resist damage due to cave-ins, explosions or other events that compromise the safety of workers in a mine, thus maintaining the function of the DTS system throughout the length of the fiber. In an embodiment, the outer conduit is a conductor of heat such that it transmits a temperature rise outside the conduit to the optical fiber contained therein. The temperature rise may be due to close proximity/direct contact with a human, or a temperature increase or decrease due to an event in the mine, such as a cave-in or flooding. In an embodiment, the outer conduit is metallic. In an embodiment, the outer conduit is capable of conducting body heat. In various embodiments, the outer conduit is a ruggedized conduit capable of protecting the optical fiber(s) from the work environment. For example, the outer conduit may be ruggedized to survive a cave-in, thus allowing continuous functionality of the DTS during such an event. An example embodiment of such a ruggedized outer conduit may include 0.25 inch outer diameter stainless steel tubing with 0.049 inch wall thickness.

In an embodiment, the fiber optic cable is placed on the floor of a mine shaft or corridor. In an embodiment, the fiber optic cable is not positioned at or near the ceiling of the mine shaft. For example, the fiber optic cable may be positioned on the floor near a side wall of the shaft. Alternatively, the fiber optic cable may be attached to a side wall of the mine shaft, alternatively in the lower half of the wall, alternatively in the lower third of the wall, alternatively in the lower quarter of the wall, alternatively on the lower portion of the wall adjacent the floor. In an embodiment, the mine shaft floor has a covering such as a grating or mat and/or has cushioning or surfacing materials such as a layer of sand, soil, or crushed gravel. In such embodiments, the fiber optic cable may be positioned within or under the walkway covering, within or under the cushioning or surfacing materials, or both. For example, the fiber optic cable may be positioned in the mine shaft floor adjacent a side wall, covered or slightly buried in sand, and covered by a walkway surface material such as a rubberized mat. In the event of an emergency, trapped personnel could easily access the fiber optic cable by folding the rubber mat away from the wall and brushing sand aside to reveal the cable. That is, placement of the fiber optic cable at or near the floor provides ready access for detecting and locating trapped workers in contrast to fiber optic cables positioned at or near the ceiling that may be inaccessible to trapped workers. The placement of the fiber optic cable within a cushioning layer such as sand may further function to prevent damage to the cable in the event of a catastrophic event such as an explosion, fire, or cave-in. The fiber optic cable or fiber may in some embodiments by placed along and/or be strapped to another structural element, such as a rail of a coal-car track, which is likely to survive a falling rock and provide protection to the fiber or fiber optic cable in such event. The fiber optic cable or fiber may be deployed within a cable tray which may be utilized to convey other cables into or within a workspace. In some embodiments the fiber optical cable may be painted a bright color and/or with phosphorescent coating or paint to aid in its recognition by workers in the event of a cave-in.

In an embodiment, the fiber optical cable may be prepared by placing the optical fiber inside the outer conduit during the manufacturing process and prior to being installed in the mine. A system for making such a cable is the FiberTube™ System of Halliburton Energy Services. In an embodiment, the fiber optic cable is manufactured and spooled on large drums or similar method prior to use at the mine. Fiber optic cable may then be transported to the worksite, unspooled and run along the mine shafts as needed.

In an alternative embodiment, the outer conduit is layed down along the desired path, and the optical fiber is pumped though the outer conduit. The optical fibers are rather delicate, but methods of pumping them into an outer conduit or sheath have been described with respect to the use of DTS in the oilfield. This pressurized fluid injection method involves using an inert fluid, such as distilled water or silicone, to set up a swirling pattern within the outer conduit which leads the fiber down the conduit in the channel formed by the flow pattern, thus avoiding possible damage that could occur if there were contact between the fiber optic and the conduit wall. A system for deploying a cable in such a way is the FiberStream™ System of Halliburton Energy Services.

In yet another embodiment, the conduit may be positioned throughout the corridors as desired, and the fibers may be pushed through the outer conduit. A system for pushing an optical fiber through a protective conduit is the FiberStem™ System of Halliburton Energy Services.

Methods for the placement of fibers into protective outer conduits are discussed in U.S. Pat. Nos. 5,163,321; 6,557,630; 6,557,249; 6,955,218 and U.S. Published patent application Ser. No. 10/378,443, each of which is incorporated herein by reference in its entirety.

In various embodiments, the optical fiber and/or the protective outer conduit may be retrievable and redeployed. Thus, the DTS may have an extended useful lifespan. For example, the optical fiber may be pulled from the outer conduit, spooled, repositioned (e.g., transported), and redeployed (e.g., pumped or pushed) within the same or another outer conduit. Alternatively, the fiber optic cable (e.g., the outer conduit having the fiber optic disposed therein) may be retrieved, spooled, repositioned (e.g., transported), and redeployed for further use.

Figure 4:
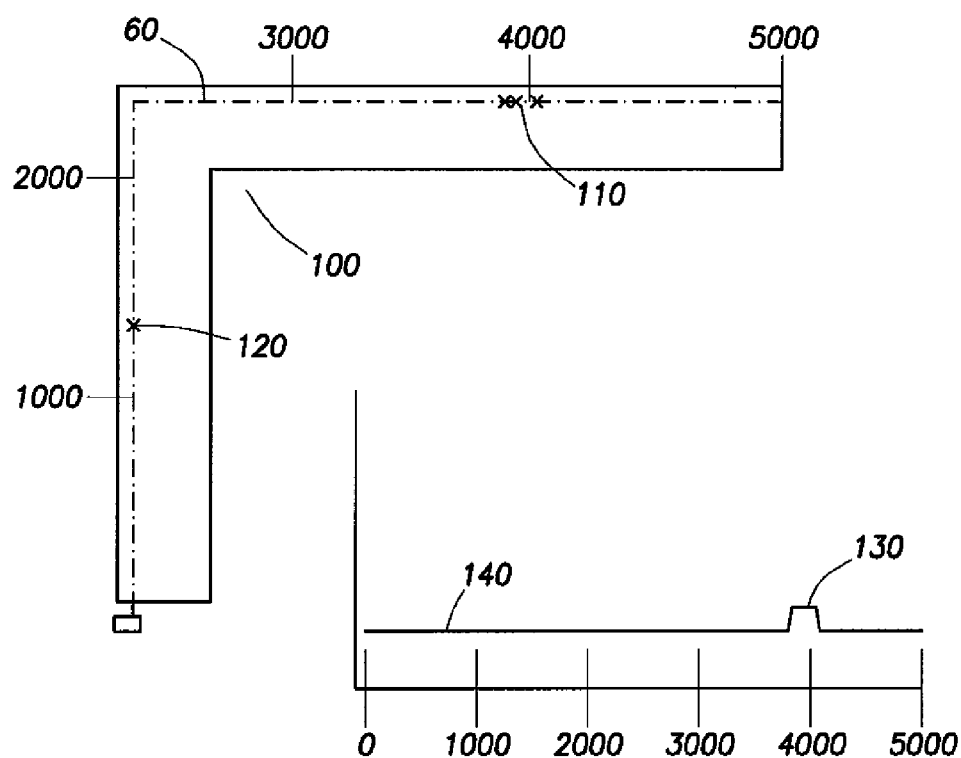
FIG. 4 is a depiction, according to an embodiment of the present disclosure, of an example situation in a mine where the temperature changes caused by a potential fire and a potential trapped miner are detected with a fiber optic cable and the positions of each are displayed on a plot of temperature differential as a function of distance along the fiber.

Due to the high sensitivity, a DTS system may be used to locate at what point along the fiber there is a temperature change from ambient (e.g., normal ground) conditions. As shown in FIG. 4, the temperature along the fiber optic cable 60 may be displayed as a function of distance. For example, in FIG. 4, in an embodiment of the present disclosure, there is a laser box 10 and fiber optic cable 60 laid along the corridors of the coal mine 100. The cable 60 extends 5000 feet in this example. The data from the DTS show a possible fire/explosion 110 at 4000 feet and a possible trapped miner 120 at about 1300 feet. The heat from the fire has radiated to the outer conduit (e.g., metal conduit) that is the protective covering of the cable 60 and been detected by the system, yielding the large temperature increase 130, on the DTS output, indicating the distance spanned by and the intensity of the event. The miner 120 has been detected by the system as temperature spike 140 indicating that the miner 120 is in close proximity or in direct contact with the cable 60 at this location in the mine. More than one trapped miner or catastrophic event may similarly be detected. In addition to indicating location, differences in the size and intensity of indications 140 and 130 may be evaluated and compared to provide information regarding the type of event (e.g., fire, flood, etc.) and/or number of persons detected by the DTS. For example, indications 140 and 130 may be compared to baseline or reference data and the results of the comparison evaluated to determine the type and nature of the event indicated. Such baseline data may reflect the temperature distribution along cable 60 at an earlier time.

By knowing the exact distance from the laser source and having distances into the mine plotted, the exact location within the mine of the temperature change is known, thereby likewise indicating an exact location of survivors as well as safety hazards such as a fire, cave-in, flood, etc. that may jeopardize the survivors and/or rescue personnel. Information regarding the exact location of survivors and/or hazards may save valuable time in rescuing trapped miner(s) and may thus save lives. The system may also be devised to alarm in the event of a predetermined temperature change. It should be noted that the use of the system of the present disclosure allows determination of the area, size, and intensity of a fire or fires (explosion). Similarly, a cave-in would cause an increase in temperature due to a lack of air flow and may also be detected. The system would also be capable of detecting a decrease in temperature, such as may occur in a flooding situation. By continuously measuring the baseline temperature throughout the system, a "normal" or baseline temperature of the rock or earth may be determined. Any forces brought to bear on the formation that may lead to a change in temperature could potentially indicate structural shifting in the area such as may precede a collapse or other failure. Such a temperature change may be indicative of, and an ability to detect such temperature change may provide a means for, an early warning would allow personnel to be evacuated and the potential threat assessed before workers reentered the mine. In an embodiment, the system of the present disclosure is capable of detecting any event that causes a localized temperature change adjacent or in close proximity to the system or component thereof.

FIG. 4 shows a single fiber optic cable 60 deployed in a single mine shaft. However, it should be understood that multiple fiber optic cables can be deployed in the same or different corridors to provide coverage in a complex mine shaft. For example, one or more laser "boxes" or sources may be attached to one or more fiber optic cables, thus allowing detection along several corridors/branches of the mine simultaneously. The computer may be set to display the temperature along the length of the fiber corresponding to an active tunnel, i.e. the one in which miners are presently working or plan to begin working. Likewise, a plurality of fiber optic cables may be deployed in a single corridor to provide redundant sensing. If needed, signal repeaters/amplifiers/boosters could be spaced intermittently along the fiber optic cable to facilitate long cable lengths. In an embodiment, the cable extends along the corridors of the mine for a distance of from 1 to 10 km.

In an embodiment according to the present disclosure, a cable consisting of an outer conduit surrounding at least one optical fiber runs along the corridors of a mine. Miners may be prepared, via training, for use of the system in the event of an emergency situation. Miners may be trained to locate the sheathed cable containing the optical fiber or fibers and lie, sit, or micturate on the cable or otherwise maintain close proximity with the cable such that a detectable increase in temperature is conducted to the optical fiber. The temperature change may then be detected by the optical fiber upon conduction of heat from the body of the miner through the outer conduit, thus indicating the distance of the miner(s) from the monitoring unit and from the event, fire, etc. Such training may include their going through the motions of locating and maintaining proximity to the fiber. Drills may be performed periodically. The system may be calibrated, either in conjunction with training or drills or separately, to train the computer and/or operator, as to the absolute temperature response and time vs. temperature response of a miner engaging the fiber or fiber cable in various ways, e.g. sitting upon, holding; with or without gloves, etc. Such calibration may too be performed for other events able to be detected as described herein.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for monitoring a workspace configured to comprise at least one worker, the method comprising deploying a fiber optic distributed temperature sensor cable in the workspace,
   wherein the sensor is configured to detect a change in temperature associated with the worker at any point along its length, and
   wherein the sensor is configured to detect a temperature differential of ±10° F. from baseline, thereby locating the worker within the workspace without action from the worker.

2. The method of claim 1 wherein the workspace is subterranean.

3. The method of claim 1 wherein the workspace is a mine, tunnel, or cave.

4. The method of claim 3 wherein the cable is disposed at or below a midpoint of a wall of at least one corridor in the workspace.

5. The method of claim 4 wherein the cable runs along the floor of the at least one corridor.

6. The method of claim 1 wherein the cable further comprises an outer protective conduit.

7. The method of claim 1 further comprising cushioning the cable to protect the cable in the event of a structural failure in the workspace.

8. The method of claim 7 wherein the cable is cushioned with sand, soil or gravel.

9. The method of claim 7 wherein the structural failure is a collapse, cave-in, fire, explosion, or flood.

10. The method of claim 1 wherein the temperature differential is provided by one or more workers in close proximity to or direct contact with the sensor.

11. The method of claim 1 wherein the temperature differential is caused by a structural change in the workspace.

12. The method of claim 1 wherein the temperature differential is provided by a collapse, cave-in, fire, explosion, or flood in a subterranean workspace.

13. The method of claim 1 wherein the temperature differential is provided by one or more workers in close proximity to the sensor; the temperature differential is provided by a collapse, cave-in, fire, explosion, or flood in a subterranean workspace; or both, wherein the sensor is configured to differentiate between the two.

14. The method of claim 1 wherein the sensor is configured to measure temperatures in spatial increments of less than 1 m.

15. The method of claim 14 wherein the location of a trapped worker or workspace event is determined to be equal to or less than 3 m.

16. The method of claim 1 wherein the deploying further comprises pumping an optical fiber through an outer protective conduit.

17. The method of claim 1 wherein the deploying further comprises pushing an optical fiber through an outer protective conduit.

18. The method of claim 1 wherein the cable comprises an optical fiber protected by an outer conduit and wherein the deploying comprises laying the cable along one or more corridors in the workspace.

19. The method of claim 1 further comprising retrieving the sensor from the workspace and redeploying the sensor in a different location.

20. A method for monitoring a workspace comprising deploying a fiber optic distributed temperature sensor cable in the workspace, wherein the sensor is configured to detect changes in temperature associated with a worker at any point along its length, and wherein the sensor is configured to detect the worker in the workspace and signal a location of the worker within the workspace without the worker contacting the fiber optic distributed temperature sensor cable.

21. The method of claim 20 wherein the cable is disposed at or below a midpoint of a wall of at least one corridor in the workspace.

22. A method for monitoring a workspace comprising deploying a fiber optic distributed temperature sensor cable configured to detect a change in temperature associated with a worker at any point along its length in the workspace and instructing workers to locate the cable and position themselves in close proximity with the cable in order to indicate their position within the workspace.

* * * * *